United States Patent
Rhee et al.

(10) Patent No.: US 10,707,783 B2
(45) Date of Patent: Jul. 7, 2020

(54) ELECTROSTATIC INDUCTION DEVICE FOR PERFORMING POWER GENERATING FUNCTION

(71) Applicant: Samsung Electronics Co., Ltd., Gyeonggi-do (KR)

(72) Inventors: Bongjae Rhee, Gyeonggi-do (KR); Sungsoo Moon, Gyeonggi-do (KR); Kemsuk Seo, Gyeonggi-do (KR); Sangmoon Lee, Gyeonggi-do (KR); Changsu Lee, Gyeonggi-do (KR); Jihun Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 269 days.

(21) Appl. No.: 15/351,125

(22) Filed: Nov. 14, 2016

(65) Prior Publication Data
US 2017/0141701 A1    May 18, 2017

(30) Foreign Application Priority Data
Nov. 13, 2015    (KR) .......... 10-2015-0159841

(51) Int. Cl.
*H02N 1/08* (2006.01)
*H02N 1/00* (2006.01)

(52) U.S. Cl.
CPC ............. *H02N 1/08* (2013.01); *H02N 1/00* (2013.01)

(58) Field of Classification Search
CPC .. H02N 1/00; H02N 1/002–1/008; H02N 1/08
USPC ............. 310/90, 308–310; 318/118; 322/2 A
See application file for complete search history.

(56) References Cited

U.S. PATENT DOCUMENTS

| | | | | |
|---|---|---|---|---|
| 2002/0067103 A1* | 6/2002 | Jerman | .................. | H02N 1/008 310/309 |
| 2004/0216288 A1* | 11/2004 | Takeuchi | ............ | H01L 41/0926 29/25.35 |
| 2011/0175367 A1* | 7/2011 | Matsumoto | ............... | F03G 7/08 290/1 A |
| 2013/0106317 A1* | 5/2013 | Ludois | ..................... | H02N 1/00 318/116 |
| 2014/0035433 A1* | 2/2014 | Matsuzawa | ............ | H02N 1/006 310/300 |
| 2014/0077657 A1* | 3/2014 | Nakatsuka | ............... | H02N 1/10 310/309 |

(Continued)

*Primary Examiner* — Bryan R Perez
(74) *Attorney, Agent, or Firm* — The Farrell Law Firm, P.C.

(57) ABSTRACT

An electrostatic induction device is provided which includes at least one first element including a first electrode, a second electrode electrically connected to the first electrode, and a third electrode electrically connected to the first electrode and the second electrode, at least one second element including a charged area having been charged with positive or negative charges and moves while adjacent to the first element so as to cause an electrostatic induction action with the first element, and a third element which is electrically connected to the first element, and receives, from the first element, a first electric current generated between the first and the second electrode, a second electric current generated between the first and the third electrode, and a third electric current generated between the second and the third electrode, by the movement of the second element, and rectifies the received first, second and third electric currents.

17 Claims, 18 Drawing Sheets

(56) References Cited

U.S. PATENT DOCUMENTS

2015/0115867 A1    4/2015  Chang
2016/0348399 A1*  12/2016  Obzhirov ................ E05B 47/00

* cited by examiner

FIG. 7C

| Direction | Signal | States | | | | | |
|---|---|---|---|---|---|---|---|
| FIRST DIRECTION | FIRST ELECTRIC CURRENT | ← | → | H | → | L | H |
| | THIRD ELECTRIC CURRENT | L | H | ← | H | L | L |
| | SECOND ELECTRIC CURRENT | H | L | L | → | H | → |
| SECOND DIRECTION | FIRST ELECTRIC CURRENT | ← | → | L | H | H | L |
| | THIRD ELECTRIC CURRENT | H | L | ← | H | L | H |
| | SECOND ELECTRIC CURRENT | L | H | H | → | L | → |

ELECTROSTATIC INDUCTION DEVICE FOR PERFORMING POWER GENERATING FUNCTION

PRIORITY

This application claims priority under 35 U.S.C. § 119(a) to Korean Patent Application No. 10-2015-0159841, which was filed on Nov. 13, 2015, in the Korean Intellectual Property Office, the entire disclosure of which is incorporated herein by reference.

BACKGROUND

1. Field of the Disclosure

The present disclosure generally relates to an electrostatic induction device which generates an electric current and identifies a state of an output signal of the electric current by using electrostatic induction.

2. Description of the Related Art

An electrostatic induction phenomenon may refer to a phenomenon in which movement of an electrified body, having been positively or negatively charged, causes movement of electric charges between a plurality of electrodes placed adjacent to the electrified body to generate an electric current. An electrostatic induction device may include an electrified body having been charged and a plurality of electrodes electrically connected to each other, and may operate as an electric generator which generates current in response to the movement of the electrified body. The electrified body which generates the electrostatic induction phenomenon may perform electric charging, using triboelectricity, electret, or a separate power supply. The electric charging using triboelectricity is a method in which electric charges generated by friction caused at the time of contact between a temporal or constant electrified body and an electrode during a relative movement between the electrified body and the electrode are charged on the surface of the electrified body. The electret uses an element in which electric charges are semi-permanently confined by applying a beam irradiation, an X-ray, or corona discharging to an electrified body.

An electrostatic induction device of a single-phase current output may output only a single-phase current and may thus be limited in providing a current wave having a high ripple form. Further, the electrostatic induction device of the single-phase current output does not have any means capable of measuring direction, rate, and distance of the movement or the rotation thereof, and thus may not have a sensor function for identifying a state of the electrostatic induction device.

SUMMARY

An aspect of the present disclosure provides, an apparatus for performing a sensor function of generating a three-phase electric current through a plurality of electrodes and identifying a state of an output signal of an electric current.

According to an aspect of the present disclosure, an electrostatic induction device includes at least one first element which includes a first electrode, a second electrode electrically connected to the first electrode, and a third electrode electrically connected to the first electrode and the second electrode, at least one second element which includes a charged area having been charged with positive charges or negative charges and moves while adjacent to the first element so as to cause an electrostatic induction action with the first element, and a third element which is electrically connected to the first element, receives, from the first element, a first electric current generated between the first electrode and the second electrode, a second electric current generated between the first electrode and the third electrode, and a third electric current generated between the second electrode and the third electrode, by the movement of the second element having been charged with the positive charges or the negative charges, and rectifies the received first electric current, second electric current, and third electric current.

BRIEF DESCRIPTION OF THE DRAWINGS

The above and other aspects, features and advantages of the present disclosure will be more apparent from the following detailed description when taken in conjunction with the accompanying drawings, in which:

FIG. 7C is a table which illustrates a state of output signals corresponding to the electric currents, respectively, in order to identify a moving direction and a displacement of an electrostatic induction device, according to an embodiment of the present disclosure;

DETAILED DESCRIPTION

Figure 1:
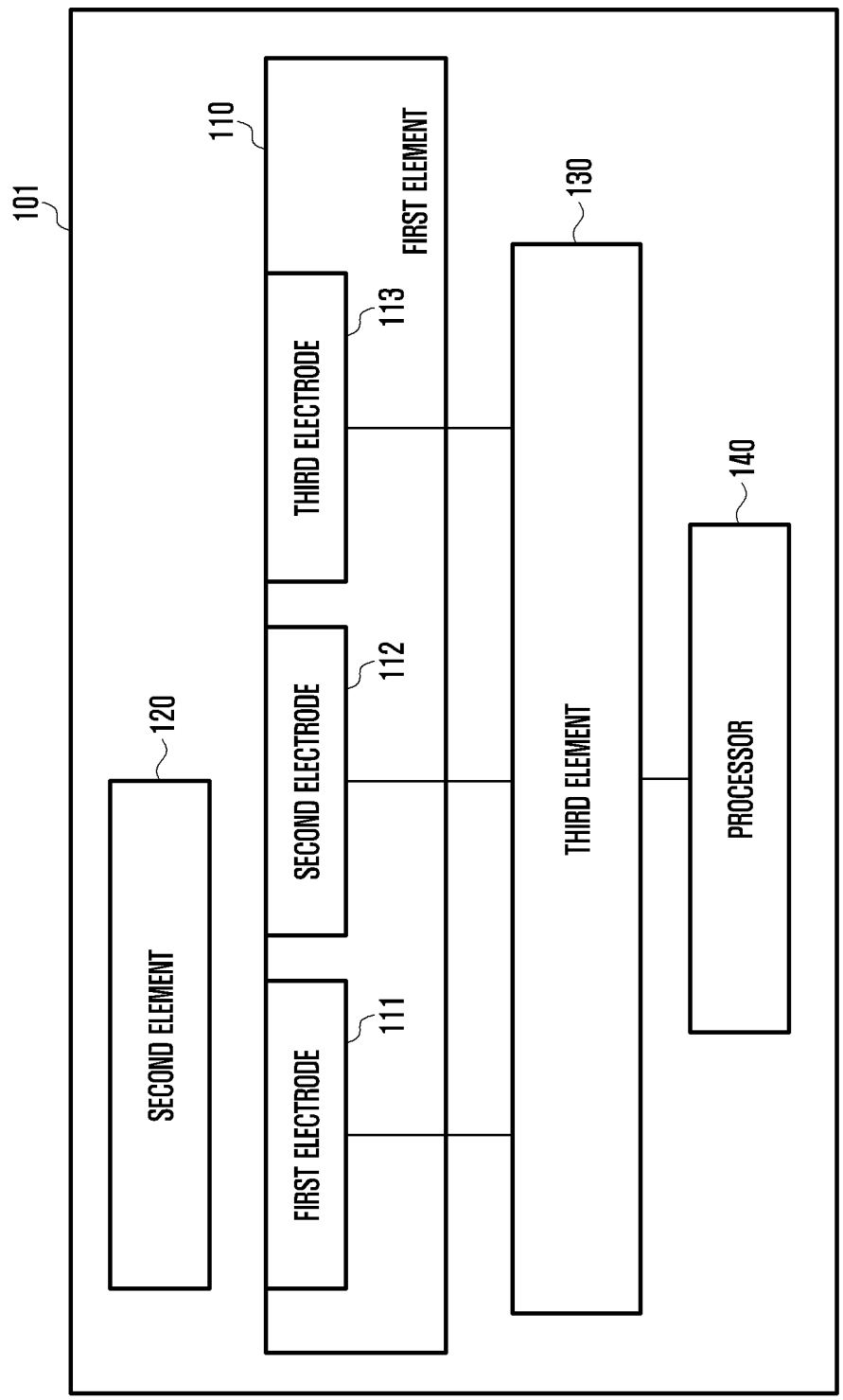
FIG. 1 is a block diagram of an electrostatic induction device, according to an embodiment of the present disclosure.

Hereinafter, an embodiment of the present disclosure will be described with reference to the accompanying drawings. The embodiments and the terms used herein do not limit the technology disclosed herein to specific forms, and should be understood to include various modifications, equivalents, and/or alternatives to the corresponding embodiments. In describing the drawings, similar reference numerals may be used to designate similar constituent elements. As used herein, singular forms may include plural forms as well unless the context clearly indicates otherwise.

The expressions "a first", "a second", "the first", or "the second" may modify corresponding elements regardless of the order or importance, and are used only to distinguish one element from another element, but does not limit the corresponding elements. When an element (e.g., first element) is referred to as being "(functionally or communicatively) connected," or "directly coupled" to another element (second element), the element may be connected directly to the other element or connected to the another element through another element (e.g., third element).

The expression "configured to" as used in the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that may perform the corresponding operations by executing one or more software programs stored in a memory device.

FIG. 1 is a block diagram of an electrostatic induction device according to an embodiment of the present disclosure.

An electrostatic induction device 101 includes an electrostatic induction device housing, a first element 110, a second element 120, a third element 130, and a processor 140. In some embodiments, the electrostatic induction device 101 may omit at least one of the elements, or may further include another element.

The first element 110 includes a first electrode 111, a second electrode 112 electrically connected to the first electrode 111, and a third electrode 113 electrically connected to the first electrode 111 and the second electrode 112. The electrodes may be made of a conductive material. The first element 110 may further include an insulator which is made of an insulating material and surrounds the electrodes, in order to prevent the electrodes from directly coming into contact with each other. The first element 110 may include a stator.

The second element 120 may move while being adjacent to the first element 110 so as to cause an electrostatic induction action with the first element 110. The second element 120 may include a charged area which is positively or negatively charged. The second element 120 may further include an insulator which is made of an insulating material and surrounds the charged area. The second element 120 may include a rotor or a mover.

The third element 130 may be electrically connected to the first element 110, receive a first electric current generated between the first electrode 111 and the second electrode 112, a second electric current generated between the first electrode 111 and the third electrode 113, and a third electric current generated between the second electrode 112 and the third electrode 113, by the movement of the second element 120 having been positively or negatively charged, and rectify the received first electric current, second electric current, and third electric current. The third element 130 may include a rectifier circuit.

The processor 140 may include one or more of a central processing unit, an application processor, and a communication processor (CP). For example, the processor 140 may carry out operations or data processing relating to the control and/or communication of at least one other element of the electrostatic induction device 101.

The processor 140 according to an embodiment of the present disclosure may identify output signals corresponding to the first electric current, the second electric current, and third electric current, respectively. The processor 140 may identify a moving direction of the electrostatic induction device 101 on the basis of the output signals corresponding to the electric currents, respectively. The processor 140 may identify a displacement of the electrostatic induction device 101, on the basis of the output signals corresponding to the electric currents, respectively.

Figure 2A:
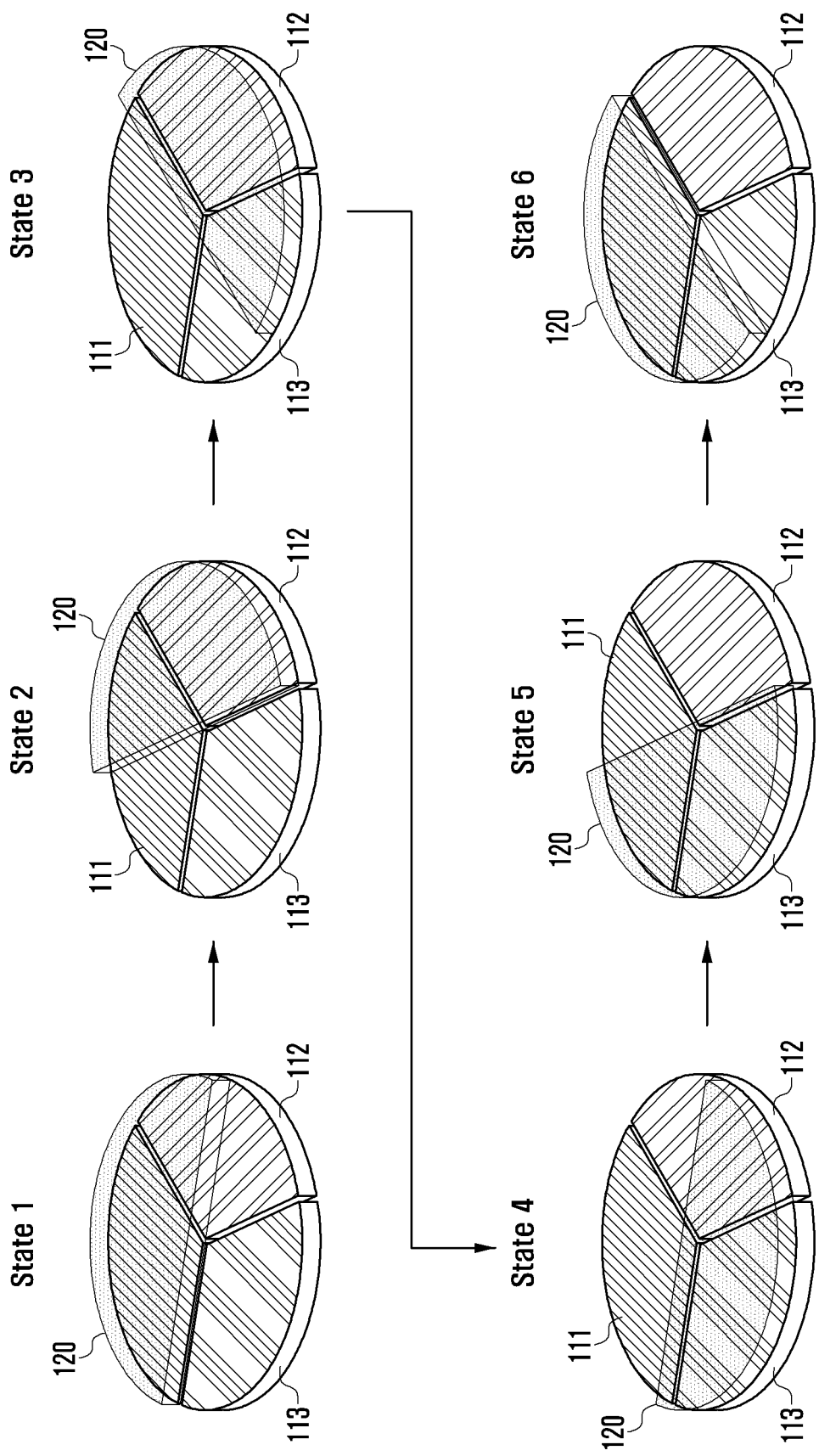
FIG. 2A illustrates a change in the movement of a second element of an electrostatic induction device, according to an embodiment of the present disclosure.

FIG. 2A illustrates a change in the movement of a second element 120 of an electrostatic induction device 101, at each state, according to an embodiment of the present disclosure.

Referring to FIG. 2A, an electrostatic induction device 101 according to an embodiment of the present disclosure may be configured as a circular shape. A charged area of the second element 120 of the electrostatic induction device 101 may be larger than upper end surfaces and/or lower end surfaces of the first electrode 111, the second electrode 112, and/or the third electrode 113. Upper end surfaces or lower end surfaces of the first electrode, the second electrode, and the third electrode of the first element may be the same size, respectively, and a charged area of the second element 120 may be a size 1.5 times larger than an upper end surface or a lower end surface of the first electrode.

A first state (state 1) of the electrostatic induction device 101 may indicate a state in which the second element 120 of the electrostatic induction device 101 is placed on an entire area of the upper end surface of the first electrode 111 and a partial area of the upper end surface of the second electrode 112. A second state (state 2) of the electrostatic induction device 101 may be a state in which a portion of the second element 120 has rotated in a clockwise direction in the first state and may indicate a state in which the second element 120 is placed on a partial area of the upper end surface of the first electrode 111 and an entire area of the upper end surface of the second electrode 112. A third state (state 3) of the electrostatic induction device 101 may be a state in which a portion of the second element 120 has rotated in a clockwise direction in the second state and may indicate a state in which the second element 120 is placed on an entire area of the upper end surface of the second electrode 112 and a partial area of the upper end surface of the third electrode 113. A fourth state (state 4) of the electrostatic induction device 101 may be a state in which a portion of the second element 120 has rotated in a clockwise direction in the third state and may indicate a state in which the second element 120 is placed on a partial area of the upper end surface of the second electrode 112 and an entire area of the upper end surface of the third electrode 113. A fifth state (state 5) of the electrostatic induction device 101 may be a state in which a portion of the second element 120 has rotated in a clockwise direction in the fourth state and may indicate a state in which the second element 120 is placed on an entire area of the upper end surface of the third electrode 113 and a partial area of the upper end surface of the first electrode 111. A sixth state (state 6) of the electrostatic induction device 101 may be a state in which a portion of the second element 120 has rotated in a clockwise direction in the fifth state and may indicate a state in which the second element 120 is placed on a partial area of the upper end surface of the third electrode 113 and an entire area of the upper end surface of the first electrode 111. As the second element 120 of the electrostatic induction device 101 has rotated in a clockwise direction, a state of the electrostatic device 101 may be changed from the first state to the sixth state. The electrostatic induction device 101 may rotate in a counterclockwise direction and a state of the electrostatic device 101 may repeatedly change according to the rotation in a counterclockwise direction.

Figure 2B:
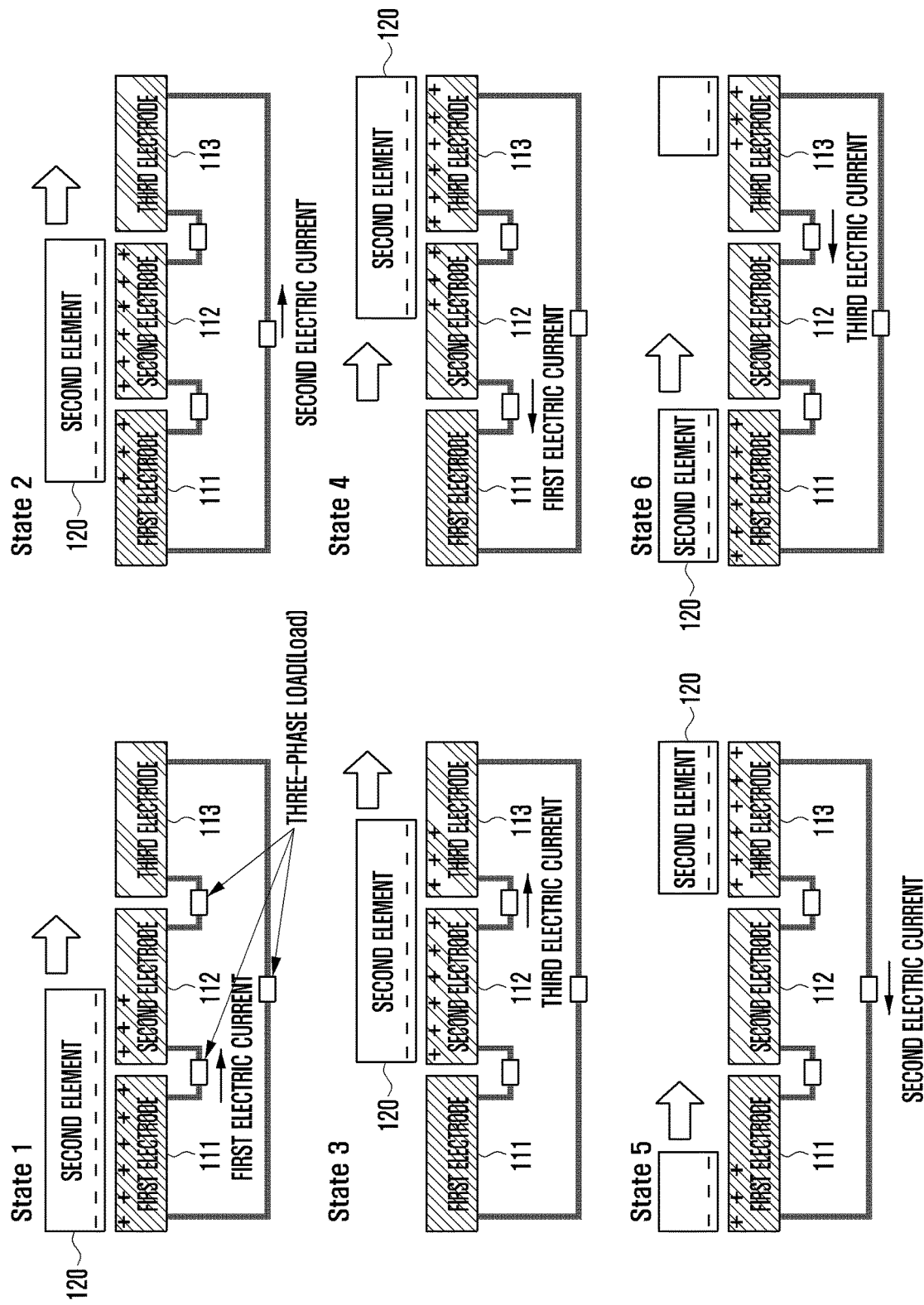
FIG. 2B illustrates a flow of an electric current generated in an electrostatic induction device, according to an embodiment of the present disclosure.

FIG. 2B illustrates a flow of an electric current generated in an electrostatic induction device, at each state, according to an embodiment of the present disclosure.

Figure 3A:
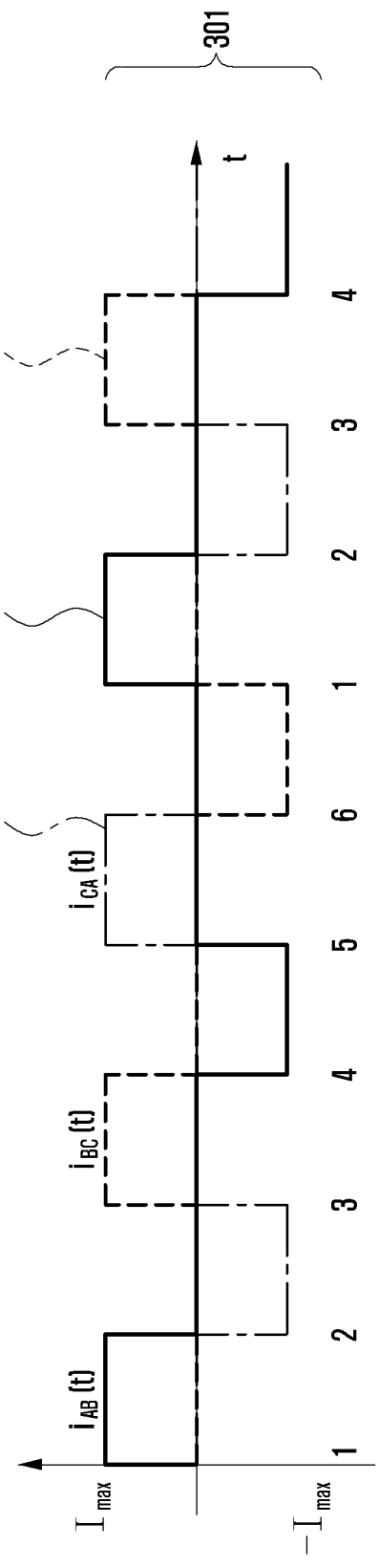
FIG. 3A illustrates a waveform graph of an electric current generated in an electrostatic induction device and a waveform graph of a rectified electric current, according to an embodiment of the present disclosure.
Figure 3A:
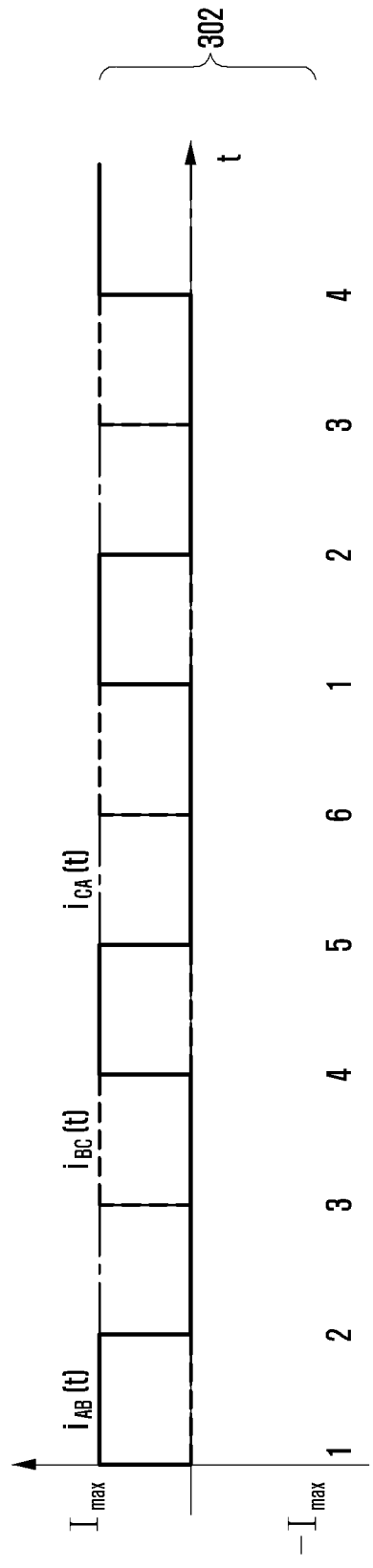
Figure 3B:
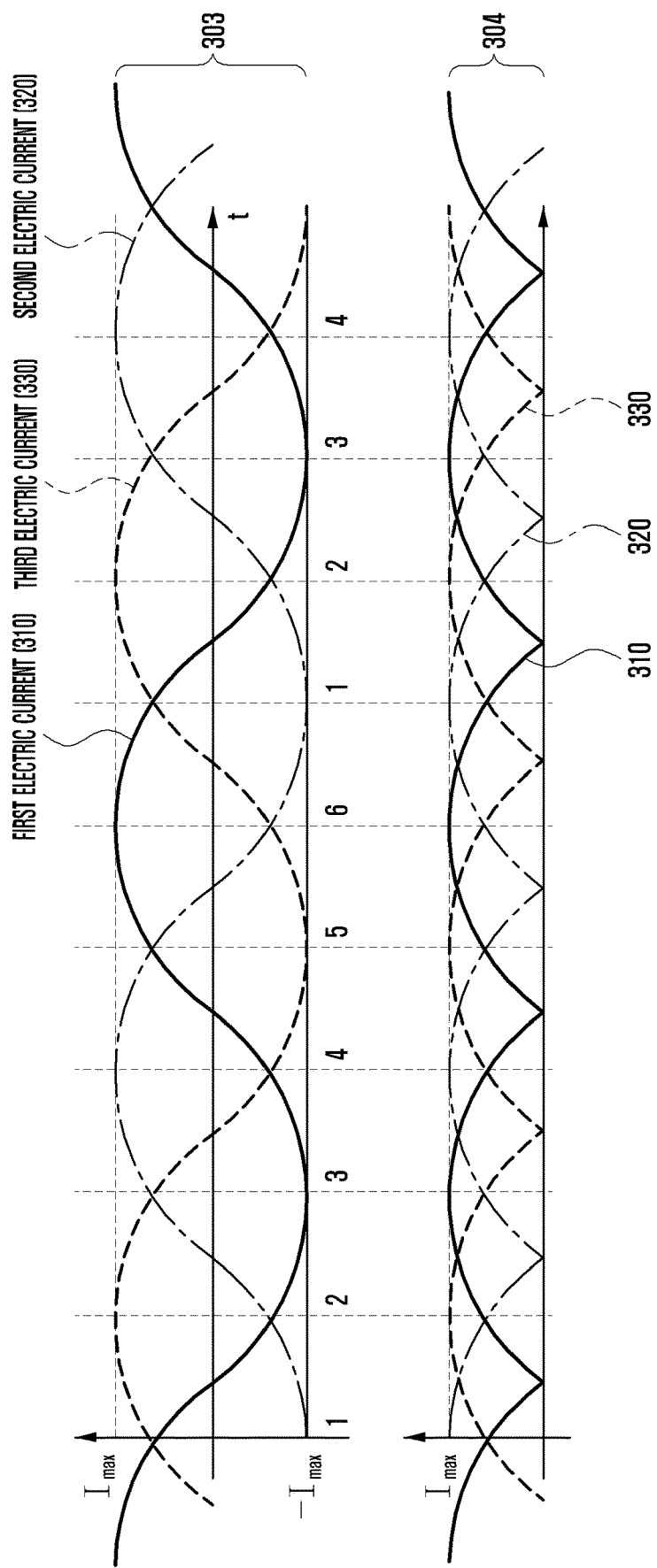
FIG. 3B illustrates a waveform graph of an electric current generated in an electrostatic induction device and a waveform graph of a rectified electric current, according to another embodiment of the present disclosure.

Referring to FIG. 2B, the second element 120 having been negatively charged may move while adjacent to the first electrode 111, the second electrode 112, and the third electrode 113 of the first element 110 in the first state (state 1) to the sixth state (state 6). In the first state (state 1), as the second element 120 moves, electrons of the second electrode 112 move to the first electrode 111, and as a result, a first electric current which flows to the second electrode 112 from the first electrode 111 may be generated. The size of the generated first electric current may gradually decrease or increase, as the second element 120 moves. For example, Graph 301 in FIG. 3A indicates a waveform of an electric current generated in an electrostatic induction device 101, when the second element 120 of the electrostatic induction device 101 performs uniform motion in an ideal state in which an electrical load is 0, and Graph 303 in FIG. 3B indicates a waveform of an electric current generated in an electrostatic induction device 101, when the second element 120 of the electrostatic induction device 101 performs uniform motion under an electrical load having an electrostatic component or an inductive component. Referring to Graph 301 in FIG. 3A, according to a change in a state, a pulse of the first electric current 310 may be shown as a pulse waveform, or, referring to Graph 303 in FIG. 3B, according to a change in a state, a pulse of the first electric current 310 may be shown as a sine waveform which gradually decreases or increases.

Referring to FIG. 2B, in the second state (state 2), as the second element 120 moves, electrons of the third electrode 113 move to the first electrode 111, and as a result, a second electric current which flows to the third electrode 113 from the first electrode 111 may be generated. The size of the generated second electric current may gradually decrease or increase, as the second element 120 moves. For example, referring to Graph 301 in FIG. 3A, according to a change in a state, a pulse of the second electric current 320 may be shown as a pulse waveform, or, referring to Graph 303 in FIG. 3B, according to a change in a state, a pulse of the second electric current 320 may be shown as a sine waveform which gradually decreases or increases. In the third state (state 3), as the second element 120 moves, electrons of the third electrode 113 move to the second electrode 112, and as a result, a third electric current which flows to the third electrode 113 from the second electrode 112 may be generated. The size of the generated third electric current may gradually decrease or increase, as the second element 120 moves. For example, referring to Graph 301 in FIG. 3A, according to a change in a state, a pulse of the third electric current 330 may be shown as a pulse waveform, or, referring to Graph 303 in FIG. 3B, according to a change in a state, a pulse of the third electric current 330 may be shown as a sine waveform which gradually decreases or increases. In the fourth state (state 4), as the second element 120 moves, electrons of the first electrode 111 move to the second electrode 112, and as a result, a first electric current may flow to the first electrode 111 from the second electrode 112 (opposite the direction of an electric current in the first state). In the fifth state (state 5), as the second element 120 moves, electrons of the first electrode 111 move to the third electrode 113, and as a result, a second electric current may flow to the first electrode 111 from the third electrode 113 (opposite the direction of an electric current in the second state). In the sixth state (state 6), as the second element 120 moves, electrons of the second electrode 112 move to the third electrode 113, and as a result, a third electric current may flow to the second electrode 112 from the third electrode 113 (opposite the direction of an electric current in the third state). The first electric current, the second electric current, and the third electric current may have a phase difference of 120 degrees, respectively.

The electrostatic induction device 101 according to an embodiment of the present disclosure may rectify a first electric current, a second electric current, and a third electric current, which are generated from the second element 120, through the third element 130. The electrostatic induction device 101 may rectify a first electric current 310, a second electric current 320, and a third electric current 330, which are alternating electric currents, to direct electric currents through the third element 130. For example, referring to Graph 301 in FIG. 3A, the third element 130 of the electrostatic induction device 101 may rectify a first electric current 310, a second electric current 320, and a third electric current 330, which are in the form of Graph 301, to generate a current waveform in Graph 302. For another example, referring to Graph 303 in FIG. 3B, the third element 130 of the electrostatic induction device 101 may rectify a first electric current 310, a second electric current 320, and a third electric current 330, which are in the form of Graph 303, to generate a current waveform in Graph 304. The electrostatic induction device 101 may output a three-phase electric current, thereby outputting a current wave having a lower ripple than that of a single-phase current output.

Figure 4A:
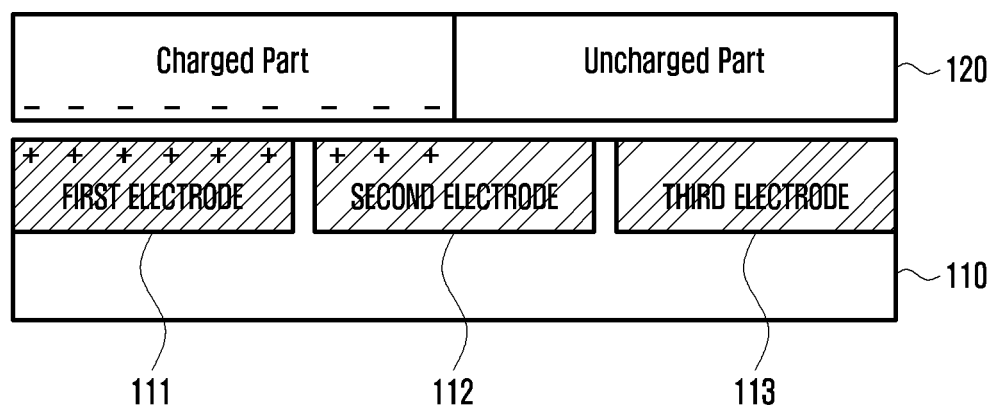
FIG. 4A illustrates a second element of an electrostatic induction device, according to an embodiment of the present disclosure.

FIG. 4A illustrates a second element of an electrostatic induction device according to an embodiment of the present disclosure. Referring to FIG. 4A, the second element 120 of the electrostatic induction device 101 may include a charged area having been charged with negative charges and an insulated area surrounding the charged area. The insulated area may be made of an insulating material so as to prevent the negative charges in the charged area from moving to another object.

Figure 4B:
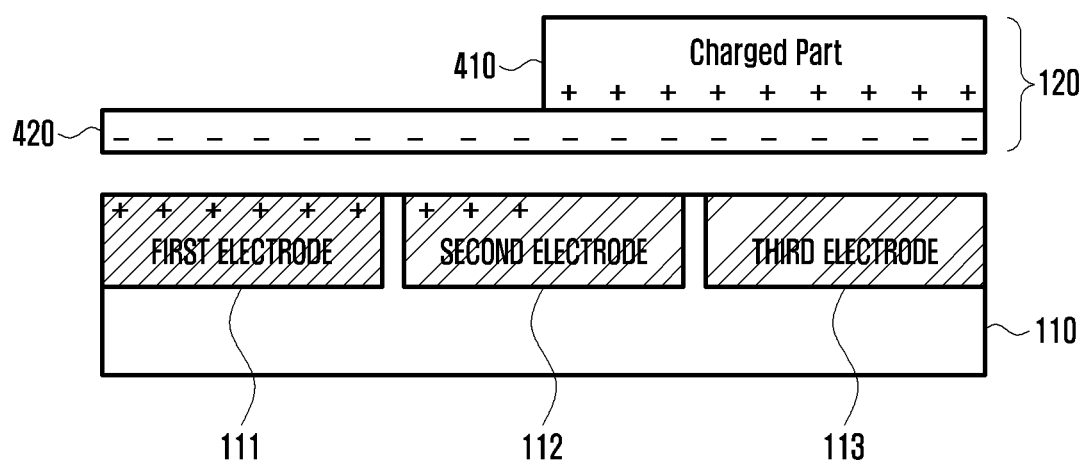
FIG. 4B illustrates a second element of an electrostatic induction device, according to another embodiment of the present disclosure.

FIG. 4B illustrates a second element of an electrostatic induction device according to an embodiment of the present disclosure. The second element 120 of the electrostatic induction device 101 may include a charged layer 420 including a charged area and a conductive layer or a charged part 410, which is made of a conductive material and is laminated on at least a partial area of the charged layer 420. For example, when the charged layer 420 of the second element 120 has been charged with negative charges, and a charged part 410 laminated on at least a partial area of the charged layer 420 has been charged with positive charges, since the negative charges of the charged layer 420 and the positive charges of an upper charged part 410 have been offset, a first electric current, a second electric current, and a third electric current may be generated by an area in which the upper charged part 410 is not laminated in the charged layer 420 (an area in which the negative charge has not been offset).

Figure 4C:
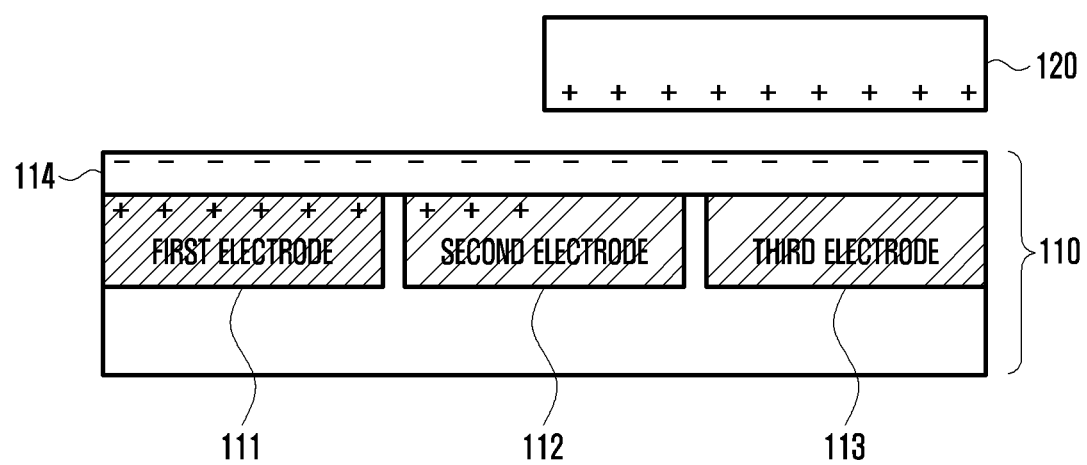
FIG. 4C illustrates a first element of an electrostatic induction device, according to an embodiment of the present disclosure.

FIG. 4C illustrates a first element of an electrostatic induction device according to an embodiment of the present disclosure. The first element 110 of the electrostatic induction device 101 may include a charged layer 114 laminated on an electrode layer including the first electrode 111, the second electrode 112, and the third electrode 113. For example, when the charged layer 114 of the first element 110 has been charged with negative charges and a charged area of the second element 120 has been charged with positive charges, as the second element 120 moves, electrons of an electrode move by a repulsive power of the negative charges of the charged layer 114 of the first element 110, and a first electric current, a second electric current, and a third electric current may be generated by the movement of the electrons. The charged layer of the second element 120 may perform electric charging of surfaces of two charged layers using triboelectricity generated at the time of friction with the charged layer 114 of the first element 110.

Figure 4D:
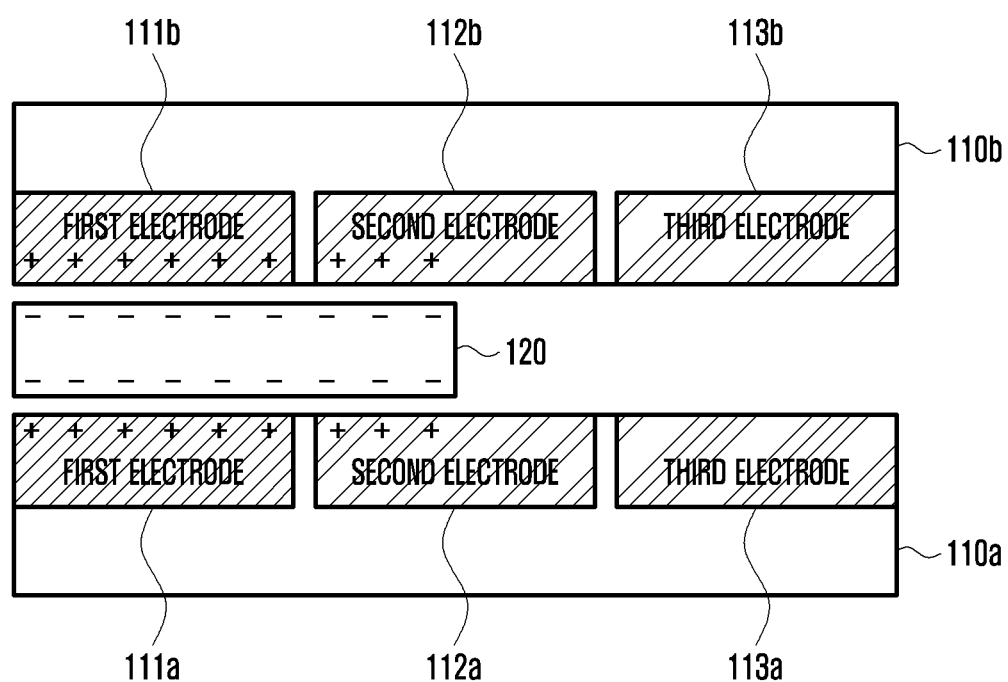
FIG. 4D illustrates a first element of an electrostatic induction device, according to another embodiment of the present disclosure.

FIG. 4D illustrates a first element of an electrostatic induction device according to an embodiment of the present disclosure. The second element 120 of the electrostatic induction device 101 may be disposed between a plurality of first elements 110a and 110b. For example, the second element 120 may be disposed between a side surface on which electrode layers 111a, 112a and 113a are arranged in the first element 110a and a side surface on which electrode layers 111b, 112b and 113b are arranged in the first element 110b and may move while adjacent to the plurality of the first elements 110a and 110b.

Figure 5A:
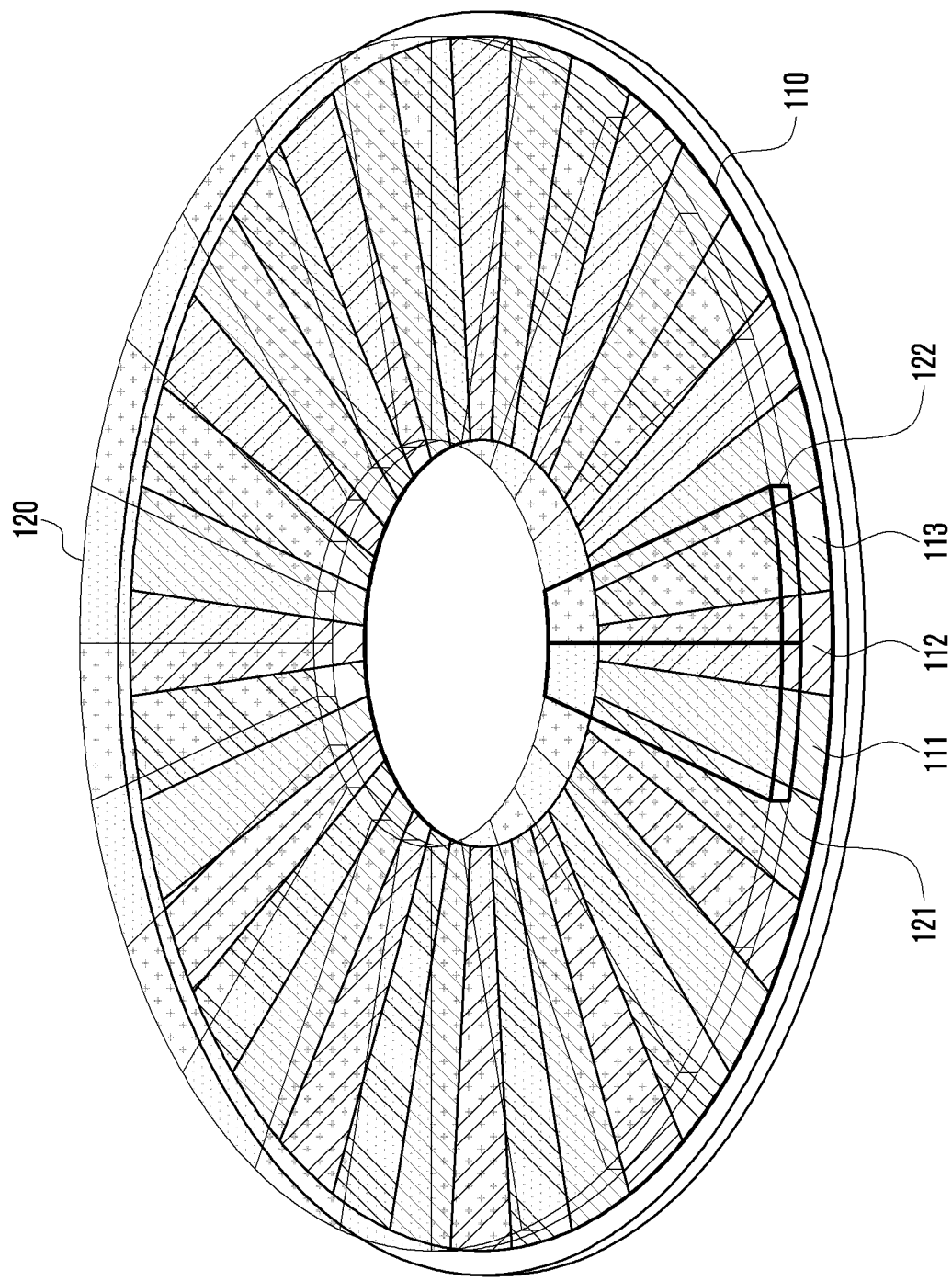
FIG. 5A illustrates a first element which includes at least one sub charged area and an insulated area surrounding the sub charged area and a second element which includes at least one sub electrode and an insulated area surrounding the sub electrode, according to an embodiment of the present disclosure.

FIG. 5A illustrates a first element which includes at least one sub charged area and an insulated area surrounding the sub charged area and a second element which includes at least one sub electrode and an insulated area surrounding the sub electrode according to an embodiment of the present disclosure.

Referring to FIG. 5A, the first element 110 of the electrostatic induction device 101 according to an embodiment of the present disclosure may include the first electrode 111, the second electrode 112, and the third electrode 113. The first electrode 111, the second electrode 112, and the third electrode 113 are arranged to be spaced apart from one another at a predetermined gap, and each of the first electrode 111, the second electrode 112, and the third electrode 113 may include at least one sub electrode. A sub electrode of the first electrode 111, a sub electrode of the second electrode 112, and a sub electrode of the third electrode 113 may be alternately arranged. The first element may include an insulated area surrounding the first electrode 111, the second electrode 112, and the third electrode 113. Specifically, the first element 110 may further include an insulated area surrounding the sub electrodes, in order to prevent the sub electrodes included in the electrodes from coming into contact with each other. The second element 120 of the electrostatic induction device 101 may further include a charged area which is positively or negatively charged and an insulated area 122 surrounding the charged area. The charged area of the second element 120 may include at least one sub charged area 121.

Figure 5B:
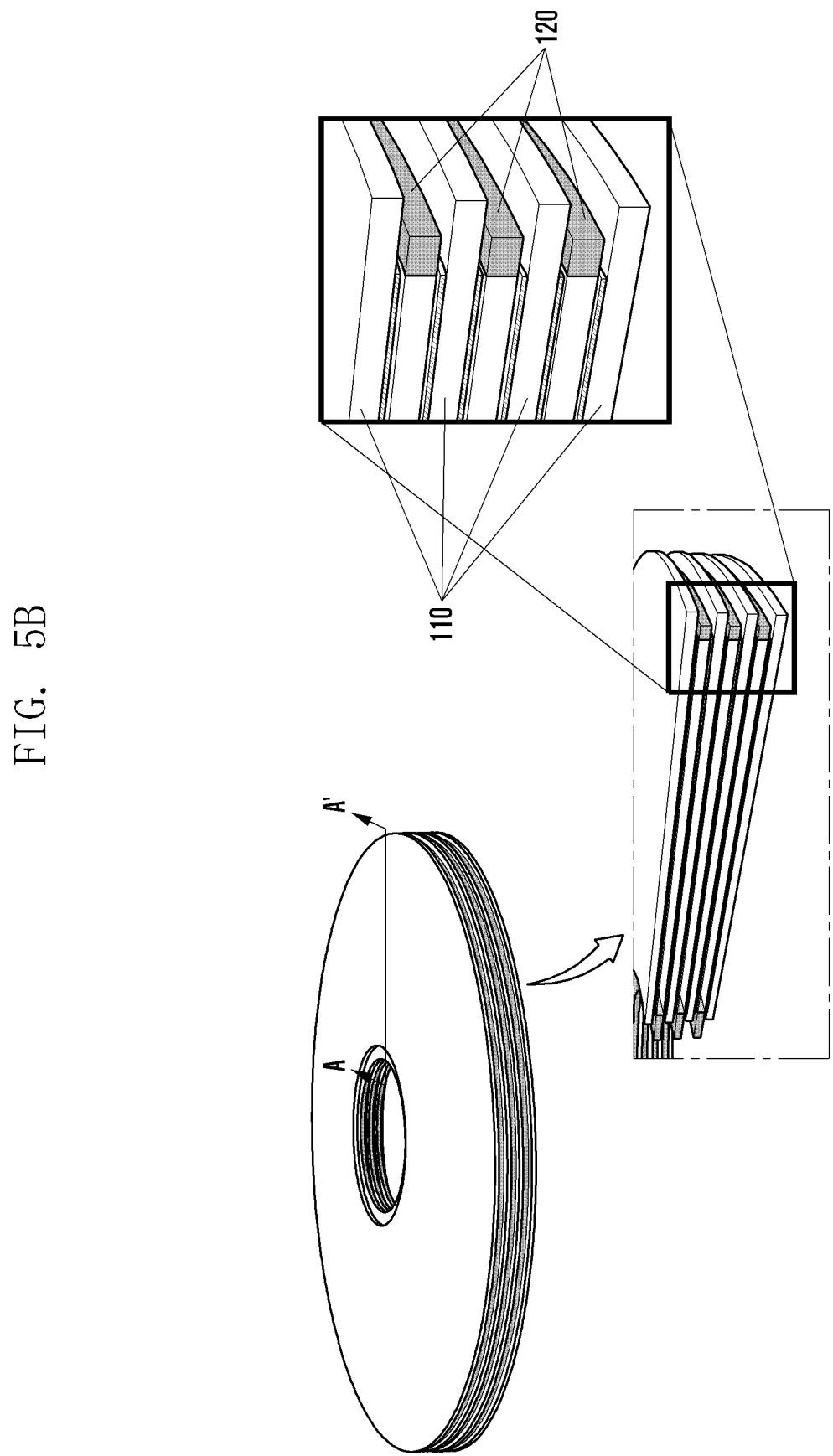
FIG. 5B illustrates a circular-shaped electrostatic induction device in which at least one first element and at least one second element are alternately laminated, according to an embodiment of the present disclosure.

FIG. 5B illustrates a circular-shaped electrostatic induction device in which at least one first element and at least one second element are alternately laminated according to an embodiment of the present disclosure.

Referring to FIG. 5B, the circular-shaped electrostatic induction device 101 may be formed as a structure in which at least one first element 110 and at least one second element 120 are alternately laminated. The second element 120 may move in a clockwise direction or a counterclockwise direction and an electric current may be generated according to the movement.

Figure 5C:
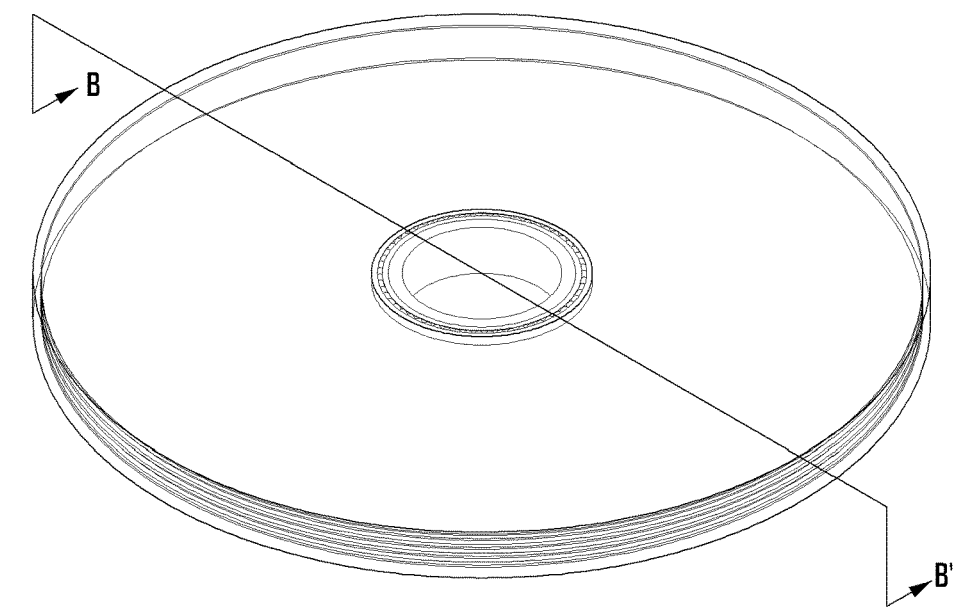
FIG. 5C illustrates a cover, a shaft, and a bearing included in an electrostatic induction device, according to an embodiment of the present disclosure.
Figure 5C:
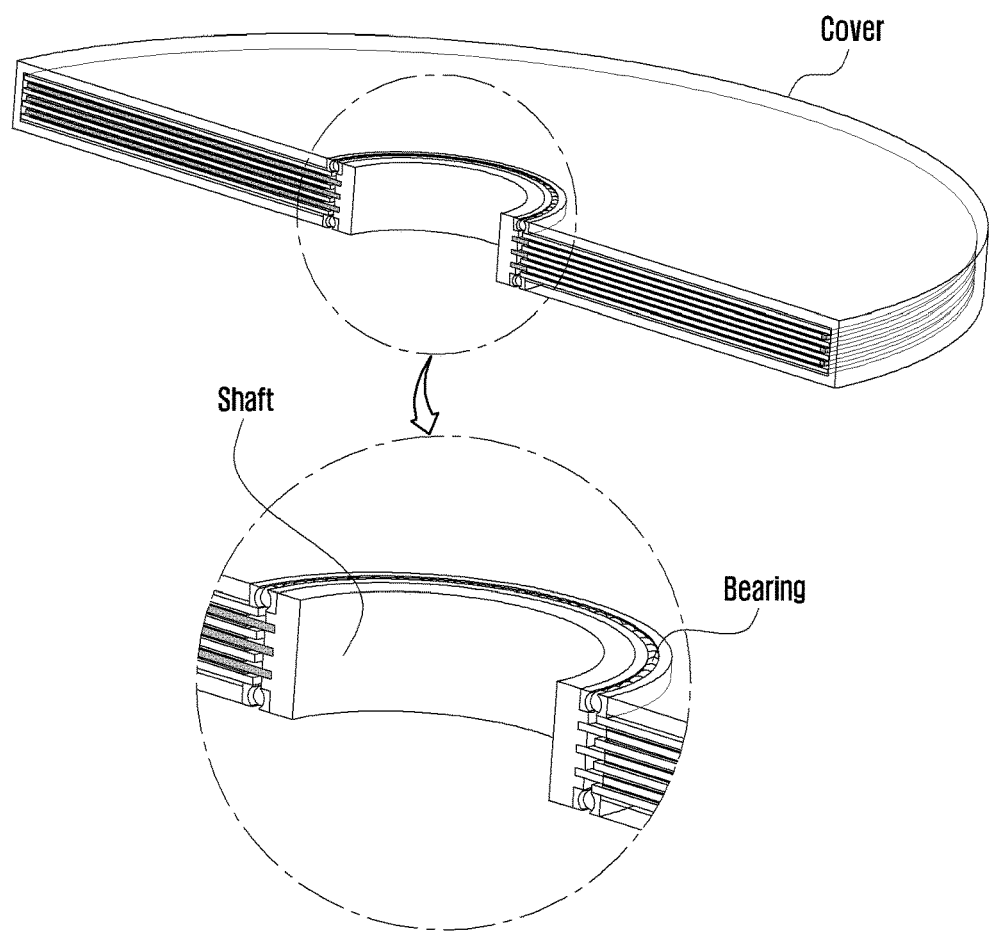

FIG. 5C illustrates a cover, a shaft, and a bearing included in an electrostatic induction device according to an embodiment of the present disclosure.

Referring to FIG. 5C, at least one first element 110 and at least one second element 120 may be alternately laminated and the electrostatic induction device 101 may include a cover surrounding at least one first element 110 and at least one second element 120 or a housing. The at least one first element 110 may be electrically connected to the third element 130, while being fixed to a shaft. At least one second element 120 may move while adjacent to the first element 110 so as to cause an electrostatic induction action with the first element 110. In order to enable the second element 120 to move smoothly, the electrostatic induction device 101 may include a bearing. The bearing may be disposed between the shaft and the second element 120.

Figure 6:
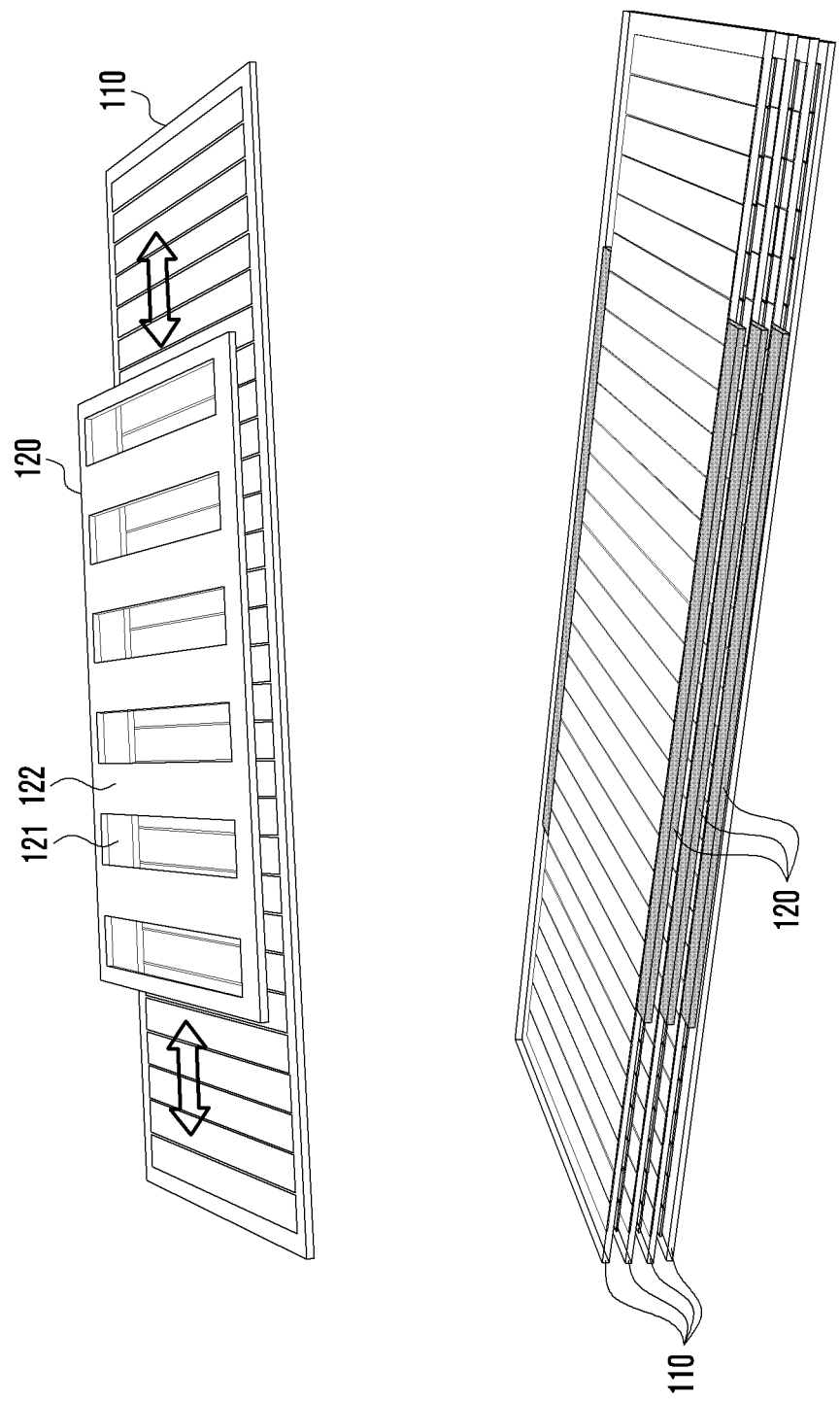
FIG. 6 illustrates a quadrangular-shaped electrostatic induction device in which at least one first element and at least one second element are alternately laminated, according to an embodiment of the present disclosure.

FIG. 6 illustrates a quadrangular-shaped electrostatic induction device in which at least one first element and at least one second element are alternately laminated according to an embodiment of the present disclosure.

Referring to FIG. 6, the quadrangular-shaped electrostatic induction device 101 may be formed as a structure in which at least one first element 110 and at least one second element 120 are alternately laminated. The second element 120 may move in a linear motion and an electric current may be generated according to the movement.

Figure 7A:
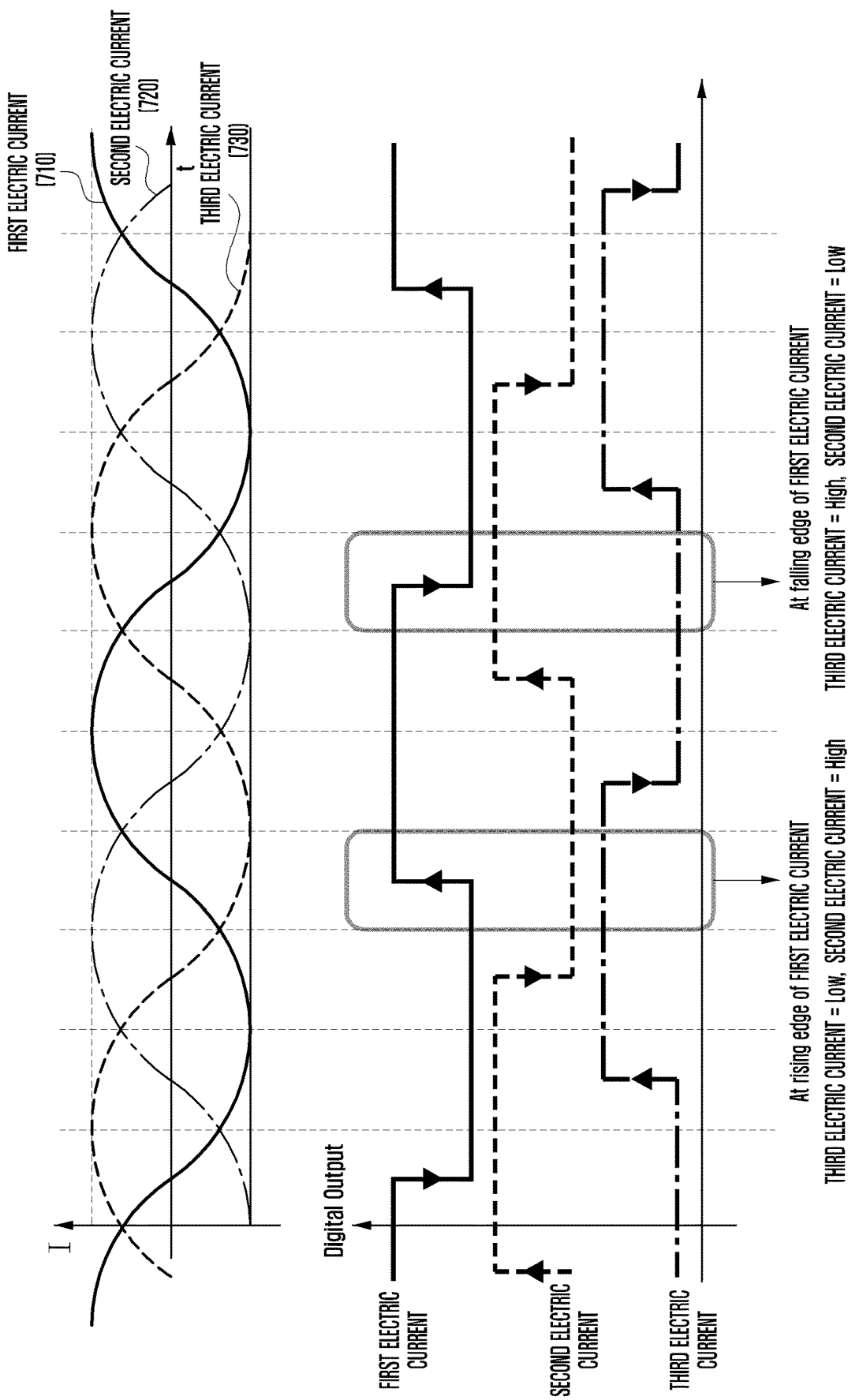
FIG. 7A is a graph illustrating a waveform of a first electric current, a second electric current, and a third electric current and a graph illustrating digital output signals corresponding to the electric currents, respectively, when a second element of an electrostatic induction device has moved in a first direction, according to an embodiment of the present disclosure.

FIG. 7A is a graph illustrating a waveform of a first electric current, a second electric current, and a third electric current and a graph illustrating digital output signals corresponding to the electric currents, respectively, when a second element of an electrostatic induction device has moved in a first direction, according to an embodiment of the present disclosure.

The second element 120 of the electrostatic induction device 101 may move in a first direction. In the circular-shaped electrostatic induction device 101, the first direction may include a clockwise direction or a counterclockwise direction. In the quadrangular-shaped electrostatic induction device 101, the first direction may include a particular straight direction. The third element 130 of the electrostatic induction device 101 may convert a first electric current, a second electric current, and a third electric current, which are alternating electric currents received from the first element 110, to square wave digital signals and output the converted digital signals. For example, referring to FIG. 7A, when the circular-shaped electrostatic induction device 101 rotates clockwise, the third element 130 may receive a first electric current 710, a second electric current 720, and a third electric current 730, which are in a sine waveform, from the first element 110. The third element 130 may convert the first electric current 710, the second electric current 720, and the third electric current 730, which are in a sine waveform, to square wave digital signals indicating high and low states.

The processor 140 of the electrostatic induction device 101 according to an embodiment of the present disclosure may identify output signals corresponding to the first electric current 710, the second electric current 720, and third electric current 730, respectively. For example, referring to FIG. 7A, when an output signal corresponding to the first electric current 710 is a rising edge, the processor 140 may identify the state of an output signal corresponding to the third electric current 730 is a low state and a state of an output signal corresponding to the second electric current 720 is a high state. For another example, when an output signal corresponding to the first electric current 710 is a falling edge, the processor 140 may identify that an output signal corresponding to the third electric current 730 is a high state and an output signal corresponding to the second electric current 720 is a low state.

Figure 7B:
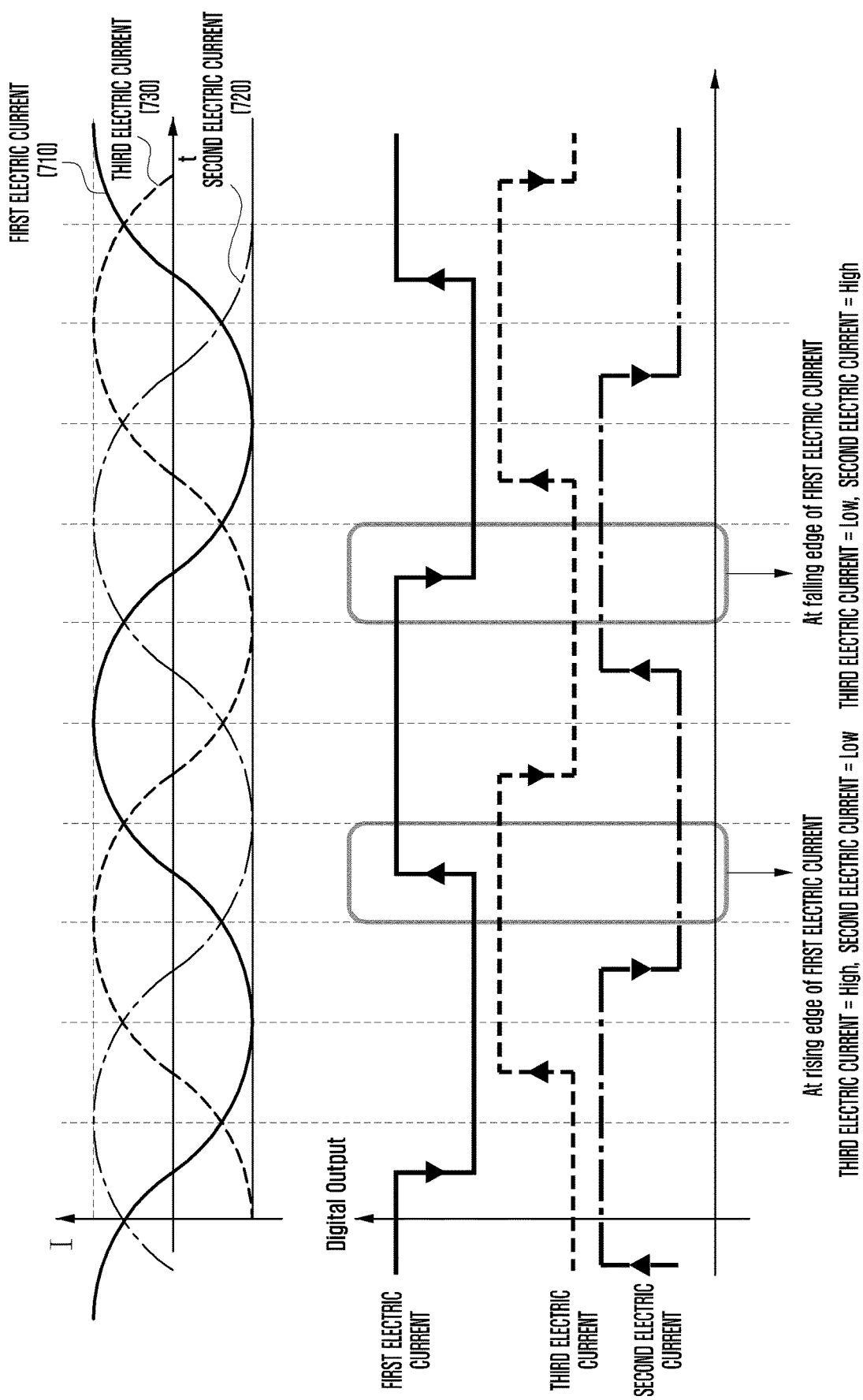
FIG. 7B is a graph illustrating a waveform of a first electric current, a second electric current, and a third electric current and a graph illustrating digital output signals corresponding to the electric currents, respectively, when a second element of an electrostatic induction device has moved in a second direction, according to an embodiment of the present disclosure.

FIG. 7B is a graph illustrating a waveform of a first electric current, a second electric current, and a third electric current and a graph illustrating digital output signals corresponding to the electric current, respectively, when a second element of an electrostatic induction device has moved in a second direction, according to an embodiment of the present disclosure.

The second element 120 of the electrostatic induction device 101 may move in a second direction opposite to the first direction. When the first direction is a clockwise direction, the second direction may be a counterclockwise direction. When the first direction is a particular straight direction, the second direction may be an opposite straight direction. The third element 130 of the electrostatic induction device 101 may convert a first electric current, a second electric current, and a third electric current, which are alternating electric currents received from the first element 110, to clock-shaped digital signals and output the converted digital signals. For example, referring to FIG. 7B, when the circular-shaped electrostatic induction device 101 rotates counterclockwise, the third element 130 may receive a first electric current 710, a second electric current 720, and a third electric current 730, which are in a sine waveform, from the first element 110. The third element 130 may convert the first electric current 710, the second electric current 720, and the third electric current 730, which are in a sine waveform, to clock-shaped digital signals indicating high and low states.

The processor 140 of the electrostatic induction device 101 according to an embodiment of the present disclosure may identify output signals corresponding to the first electric current 710, the second electric current 720, and third electric current 730, respectively. For example, referring to FIG. 7B, when an output signal corresponding to the first electric current 710 is a rising edge, the processor 140 may identify that an output signal corresponding to the third electric current 730 is a high state and an output signal corresponding to the second electric current 720 is a low state. For another example, when an output signal corresponding to the first electric current 710 is a falling edge, the processor 140 may identify that an output signal corresponding to the third electric current 730 is a low state and an output signal corresponding to the second electric current 720 is a high state.

FIG. 7C is a table which illustrates a state of output signals corresponding to the electric currents, respectively, in order to identify a moving direction and a displacement of an electrostatic induction device according to an embodiment of the present disclosure.

The processor 140 of the electrostatic induction device 101 according to an embodiment of the present disclosure may identify a moving direction of the electrostatic induction device 101 on the basis of output signals corresponding to the electric currents, respectively. For example, referring to FIG. 7C, when an output signal corresponding to the first electric current 710 is a rising edge, the processor 140 may identify that an output signal corresponding to the third electric current 730 is a low state, an output signal corresponding to the second electric current 720 is a high state, and a moving direction of the electrostatic induction device 101, which corresponds to the states, is the first direction. When an output signal corresponding to the first electric current 710 is a falling edge, the processor 140 may identify that an output signal corresponding to the third electric current 730 is a high state, an output signal corresponding to the second electric current 720 is a low state, and a moving direction of the electrostatic induction device 101, which corresponds to the states, is the first direction. For another example, when an output signal corresponding to the first electric current 710 is a rising edge, the processor 140 may identify that an output signal corresponding to the third electric current 730 is a high state, an output signal corresponding to the second electric current 720 is a low state, and a moving direction of the electrostatic induction device 101, which corresponds to the states, is the second direction. When an output signal corresponding to the first electric current 710 is a falling edge, the processor 140 may identify that an output signal corresponding to the third electric current 730 is a low state, an output signal corresponding to the second electric current 720 is a high state, and a moving direction of the electrostatic induction device 101, which corresponds to the states, is the second direction. The processor 140 according to an embodiment of the present disclosure is not limited to the examples herein, may identify output signals corresponding to the electric currents, respectively, on the basis of an edge state of an output signal corresponding to the second electric current or an edge state of an output signal corresponding to the third electric current, and may identify a moving direction of the electrostatic induction device 101, on the basis of the output signals.

The processor 140 of the electrostatic induction device 101 according to an embodiment of the present disclosure may identify a displacement of the electrostatic induction device 101, on the basis of output signals corresponding to the electric currents, respectively. For example, referring to FIG. 7C, the processor 140 may identify a state of an output signal corresponding to the first electric current 710 and may identify the number of rising edges or the number of falling edges, which are indicated in the output signal. The processor 140 may identify a displacement of the electrostatic induction device 101, on the basis of the number of rising edges or the number of falling edges. For example, when a total of 5 falling edges are identified, the processor 140 may identify that the number of rotations of the electrostatic induction device is 5. The processor 140 is not limited to the examples herein, may identify the number of edges of an output signal corresponding to the second electric current or the number of edges of an output signal corresponding to the third electric current, and may identify a displacement of the electrostatic induction device 101, on the basis of the number of edges of the output signals.

Figure 8:
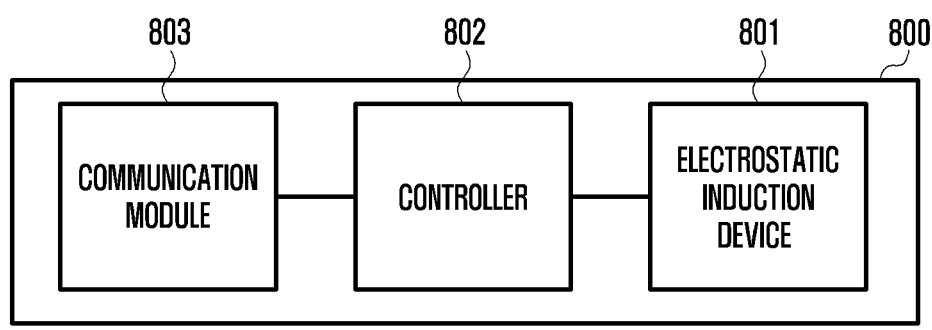
FIG. 8 is a block diagram of an electronic device including an electrostatic induction device, according to an embodiment of the present disclosure.

FIG. 8 is a block diagram of an electronic device 800 including an electrostatic induction device 801 according to an embodiment of the present disclosure.

An electronic device 800 may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to an embodiment of the present disclosure, the wearable device may include at least one of an accessory type (e.g., a watch, a ring, a bracelet, an anklet, a necklace, eyeglasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, the electronic device 800 may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung Home-Sync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM), a point of sales (POS) terminal, or an Internet of things (IoT) device (e.g., a light bulb, various sensors, electric or gas meter, a sprinkler device, a fire alarm, a thermostat, a streetlamp, a toaster, sporting equipment, a hot water tank, a heater, a boiler, etc.).

According to an embodiment of the present disclosure, the electronic device 800 may include at least one of a piece of furniture or a building/structure, an electronic board, an electronic signature receiving device, a projector, and various types of measuring instruments (e.g., a water meter, an electric meter, a gas meter, a radio wave meter, and the like). The electronic device 800 may be one or more combinations of various devices described above. The electronic device 800 may be a flexible electronic device 800. In addition, the electronic device 800 is not limited to devices described above and may include a new electronic device 800 according to development of new technology.

The electronic device 800 according to an embodiment of the present disclosure includes an electrostatic induction device 801, a controller 802, and a communication module 803. The electrostatic induction device 801 may perform functions of the electrostatic induction device 101 described in FIG. 1.

The controller 802 may include one or more of a central processing unit (CPU), an application processor (AP), and a communication processor (CP). For example, the controller 802 may carry out operations or data processing relating to the control and/or communication of at least one other element of the electronic device 800.

The controller 802 according to an embodiment of the present disclosure may control at least one of direction information and/or displacement information of the movement of the second element to be transmitted to an external electronic device through the communication module 803. The controller 802 may control a characteristic of at least one of a plurality of modules included in the electronic device to be adjusted, on the basis of at least one of direction information and/or displacement information of the movement of the second element of the electrostatic induction device 801.

For example, the communication module 803 may configure communication between the electronic device 800 and the external electronic device. For example, the communication module 803 may be connected to a network through wireless or wired communication to communicate with the external electronic device.

The wireless communication may use at least one of, for example, long term evolution (LTE), LTE-advance (LTE-A), Code Division Multiple Access (CDMA), wideband CDMA (WCDMA), universal mobile telecommunications system (UMTS), wibro (Wireless Broadband), global system for mobile communications (GSM), etc., as a cellular communication protocol. Further, the wireless communication may include, for example, short-range communication. The short range communication may include, for example, at least one of Wi-Fi, Bluetooth, near field communication (NFC), global navigation satellite system (GNSS), etc. The GNSS may include at least one of, for example, a global positioning system (GPS), a Global navigation satellite system (Glonass), a Beidou navigation satellite system (Beidou), and Galileo (European global satellite-based navigation system) according to the place of usage, a bandwidth, etc. The wired communication may include, for example, at least one of a universal serial bus (USB), a high definition multimedia interface (HDMI), recommended standard 232 (RS-232), a plain old telephone service (POTS), etc. The network may include a telecommunication network, for example, at least one of a computer network (e.g., a LAN or a WAN), the Internet, and a telephone network. The electronic device 800 may include a memory, an input/output interface, a display, a sensor module, an audio module, a camera module, and the like.

Figure 9:
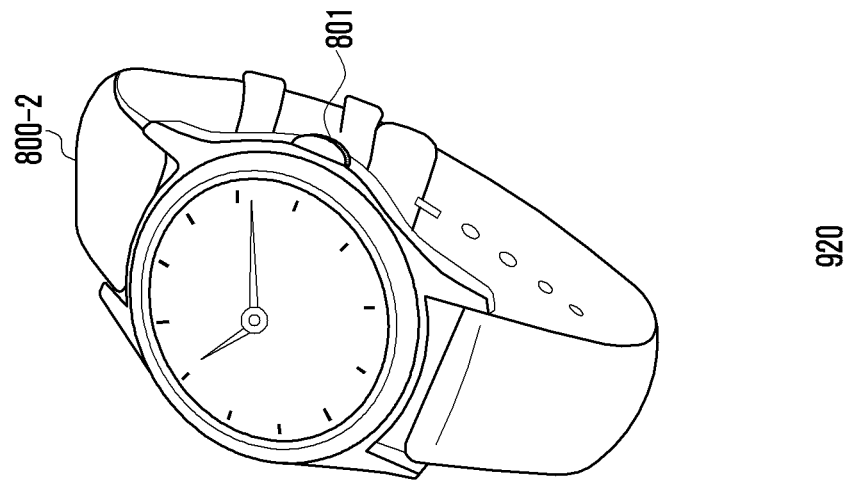
FIG. 9 illustrates an electronic device including an electrostatic induction device, according to an embodiment of the present disclosure.
Figure 9:
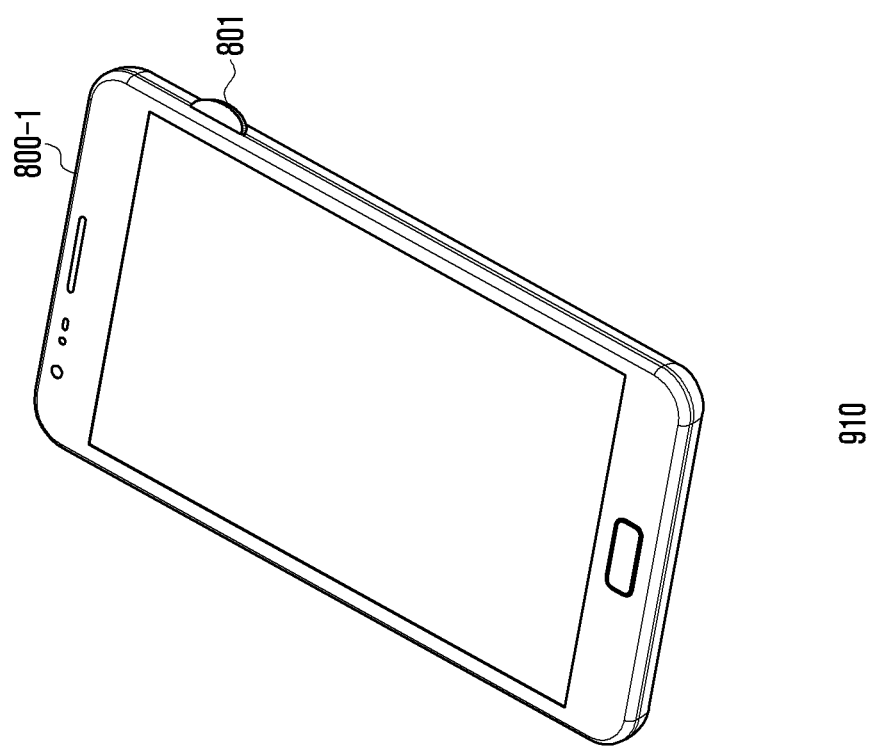

FIG. 9 illustrates embodiments of electronic devices 800-1 and 800-2 including an electrostatic induction device 801 according to an embodiment of the present disclosure.

Referring to 910 in FIG. 9, the electronic device 800-1 may be, for example, in a form of a portable terminal. The electronic device 800-1 may identify at least one of a direction and/or a displacement of the movement of a second element of the electrostatic induction device 801 which moves by a user's gesture and may generate information on at least one of a direction and/or a displacement of the movement of the second element. The electronic device 800-1 may transmit at least one of direction information and/or displacement information of the movement of the second element to an external electronic device (e.g. a server or a computer) through the communication module 803. The electronic device 800-1 according to an embodiment of the present disclosure may adjust a characteristic of at least one of a plurality of modules included in the electronic device 800-1, on the basis of at least one of direction information and/or displacement information of the movement of the second element. For example, when a user rotates the electrostatic induction device 801 in a first direction (for example, a counterclockwise direction), the electronic device 800-1 may increase the volume size of an audio module or the brightness level of a display module. In addition, when the user rotates the electrostatic induction device 801 in a second direction opposite to the first direction (for example, a clockwise direction), the electronic device 800-1 may decrease the volume size of an audio module or the brightness level of a display module. For another example, the electronic device 800-1 may adjust the extent of the volume size and the extent of the brightness level according to displacement information (for example, the extent of rotation) of the movement of the second element of the electrostatic induction device 801. The electronic device 800-1 according to an embodiment of the present disclosure is not limited to the examples herein and may include an embodiment which adjusts characteristics of various modules.

Referring to 920 in FIG. 9, the electronic device 800-2 may be, for example, in a form of a smart watch which is a wearable device. The electronic device 800-2 may adjust a characteristic of at least one of a plurality of modules included in the electronic device 800-2, on the basis of at least one of direction information and/or displacement information of the movement of the second element. For example, when a user rotates the electrostatic induction device 801 in a first direction (for example, a counterclockwise direction), the electronic device 800-2 may set a date or time later than the currently set date or time. In addition, when the user rotates the electrostatic induction device 801 in a second direction opposite to the first direction (for example, a clockwise direction), the electronic device 800-2 may set a date or time earlier than the currently set date or time. For another example, the electronic device 800-2 may adjust the extent of date or time, which has been set according to displacement information (for example, the extent of rotation) of the movement of the second element of the electrostatic induction device 801. The electronic device 800-2 according to an embodiment of the present disclosure is not limited to the examples herein and may include an embodiment which adjusts characteristics of various modules.

The electronic device including the electrostatic induction device according to an embodiment of the present disclosure may be in a form of an Internet of things (IoT) device and may transmit direction information and/or displacement information of the movement of the second element of the electrostatic induction device to an external electronic device. For example, when the electronic device is installed in piping through which water or oil flows, the electronic device may operate as a sensor which transmits direction information and displacement information which are related to a rate of flow in the piping to the outside. For another example, when the electronic device is installed in a component such as a wheel for a toy, the electronic device may identify a movement direction and/or a movement distance of a wheel for a toy so as to enable the toy to perform various operations and may transmit the information to an external electronic device. The electronic device including the electrostatic induction device according to an embodiment of the present disclosure is not limited to the examples herein, may be in a form of various Internet of things (IoT) devices, and may adjust a characteristic of each module of the electronic device using direction information and/or displacement information of the movement of the second element of the electrostatic induction device.

The term "module" used in the present disclosure may refer to, for example, a unit including one or more combinations of hardware, software, and firmware. The term "module" may be interchangeable with a term, such as "unit," "logic," "logical block," "component," "circuit," and the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific IC (ASIC) chip, a field-programmable gate array (FPGA), and a programmable-logic device for performing certain operations which have been known or are to be developed in the future.

Examples of computer-readable media include magnetic media, such as hard disks, floppy disks, and magnetic tape, optical media such as compact disc ROM (CD-ROM) and DVD, magneto-optical media, such as floptical disks, and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to an embodiment of the present disclosure may include one or more components, remove some of them, or include new components. The operations performed by modules, programming modules, or the other components, may be executed in serial, parallel, repetitive or heuristic fashion. Part of the operations may be executed in any other order, skipped, or executed with additional operations.

A method for adjusting a camera exposure in an electronic device according to an embodiment of the present disclosure may identify an exposure state of a partial area selected by a user from the entire area of a preview image, and provide a screen for adjusting an exposure correctly based on the identification result of the exposure state.

While the present disclosure has been shown and described with reference to an embodiment thereof, it will be understood by those skilled in the art that various changes in form and details may be made therein without departing from the spirit and scope of the present disclosure as defined by the appended claims and their equivalents.

What is claimed is:

1. An electrostatic induction device comprising:
   at least one first element configured to include a first electrode, a second electrode electrically connected to the first electrode, and a third electrode electrically connected to the first electrode and the second electrode;
   at least one second element configured to include a charged area having been charged with positive charges or negative charges and move while adjacent to the first element so as to cause an electrostatic induction action with the first element;
   a third element configured to be electrically connected to the first element, receive from the first element, a first electric current generated between the first electrode and the second electrode, a second electric current generated between the first electrode and the third electrode, and a third electric current generated between the second electrode and the third electrode, by the movement of the second element having been charged with the positive charges or the negative charges, and rectify the received first electric current, second electric current, and third electric current; and
   a processor configured to identify a moving direction of the electrostatic induction device based on an output signal corresponding to the second electric current and an output signal corresponding to the third electric current, when an output signal corresponding to the first electric current is a rising edge or a falling edge,
   wherein a charged area of the second element is an entire area of the second element, and is configured to be larger than an upper end surface or a lower end surface of the first electrode, the second electrode, or the third electrode.

2. The device of claim 1, wherein the upper end surfaces or the lower end surfaces of the first electrode, the second electrode, and the third electrode are each configured to be the same size, respectively, and the charged area of the second element is configured to be a size about 1.5 times larger than an upper end surface or a lower end surface of the first electrode.

3. The device of claim 1, wherein the first element includes a stator, the second element includes one of a rotor and a mover, and the third element includes a rectifier circuit.

4. The device of claim 1, wherein the second element further includes an insulated area surrounding the charged area.

5. The device of claim 1, wherein the second element further includes a charged layer including the charged area and a conductive layer which is laminated on at least a partial area of the charged layer.

6. The device of claim 1, wherein the first element further includes a charged layer laminated on an electrode layer including the first electrode, the second electrode, and the third electrode.

7. The device of claim 1, wherein the second element is disposed between two first elements and moves while adjacent to the two first elements.

8. The device of claim 1, wherein the first element further includes an insulated area surrounding the first electrode, the second electrode, and the third electrode.

9. The device of claim 1, wherein the first electrode, the second electrode, and the third electrode of the first element are arranged to be spaced apart from one another at a predetermined gap, and each of the first electrode, the second electrode and the third electrode includes at least one sub electrode.

10. The device of claim 1, wherein the second element further includes an insulated area surrounding the charged area.

11. The device of claim 1, wherein the charged area of the second element includes at least one sub charged area.

12. The device of claim 1, wherein the at least one first element and the at least one second element are alternately laminated.

13. The device of claim 1, wherein the third element rectifies the first electric current, the second electric current, and the third electric current to direct electric currents.

14. The device of claim 1, further comprising a processor configured to identify a displacement of the electrostatic induction device on the basis of output signals corresponding to the electric currents.

15. An electronic device comprising:
   an electrostatic induction device including:
      at least one first element configured to include a first electrode, a second electrode electrically connected to the first electrode, and a third electrode electrically connected to the first electrode and the second electrode;
      at least one second element configured to include a charged area having been charged with positive charges or negative charges and move while adjacent to the first element so as to cause an electrostatic induction action with the first element;
      a third element configured to be electrically connected to the first element, receive, from the first element, a first electric current generated between the first electrode and the second electrode, a second electric current generated between the first electrode and the third electrode, and a third electric current generated between the second electrode and the third electrode, by the movement of the second element having been charged with the positive charges or the negative charges, and rectify the received first electric current, second electric current, and third electric current;
   a processor configured to identify at least one of a direction and a displacement of the movement of the second element on the basis of output signals corresponding to the electric currents, and generate information on at least one of the direction and the displacement of the movement of the second element; and
   a controller configured to control at least one of direction information and displacement information of the movement of the second element to be transmitted to an external electronic device through a communication module,
   wherein the processor is configured to identify a moving direction of the electrostatic induction device based on an output signal corresponding to the second electric current and an output signal corresponding to the third electric current, when an output signal corresponding to the first electric current is a rising edge or a falling edge, and
   wherein a charged area of the second element is an entire area of the second element, and is configured to be larger than an upper end surface or a lower end surface of the first electrode, the second electrode or the third electrode.

16. The device of claim 15, wherein the controller is further configured to control a characteristic of at least one of a plurality of modules included in the electronic device to be adjusted on the basis of at least one of direction information and displacement information of the movement of the second element.

17. The device of claim 16, wherein the controller is further configured to control a brightness level of a display on the basis of at least one of direction information and displacement information of the movement of the second element.

* * * * *